United States Patent [19]

Robyn et al.

[11] Patent Number: 5,270,075
[45] Date of Patent: Dec. 14, 1993

[54] CERAMIC WELDING PROCESS

[75] Inventors: Pierre Robyn, Nivelles; Alexandre Zivkovic, Uccle; Léon-Philippe Mottet, Nalinnes, all of Belgium

[73] Assignee: Glaverbel, Brussels, Belgium

[21] Appl. No.: 593,892

[22] Filed: Oct. 4, 1990

[30] Foreign Application Priority Data

Oct. 5, 1989 [LU] Luxembourg .......................... 87 602

[51] Int. Cl.⁵ ........................... B05D 1/36; B05D 1/02
[52] U.S. Cl. .................................... 427/201; 427/236; 427/422; 427/427
[58] Field of Search ............... 427/423, 427, 422, 201; 42/422, 427, 201, 236

[56] References Cited

U.S. PATENT DOCUMENTS

| | | | |
|---|---|---|---|
| 3,800,983 | 4/1974 | Brichard et al. | 222/52 |
| 4,560,591 | 12/1985 | Plumat et al. | 427/422 |
| 4,634,611 | 1/1987 | Browning | 427/423 |
| 4,696,855 | 9/1987 | Pettit et al. | 427/423 |
| 5,002,805 | 3/1991 | Robyn et al. | 427/309 |
| 5,061,527 | 10/1991 | Watanabe et al. | 427/423 |

FOREIGN PATENT DOCUMENTS

| | | |
|---|---|---|
| 0203556 | 12/1986 | European Pat. Off. . |
| 0274286 | 7/1988 | European Pat. Off. . |
| 0490980 | 1/1991 | European Pat. Off. . |
| 111538 | 5/1958 | U.S.S.R. . |
| 325471 | 3/1972 | U.S.S.R. . |
| 943292 | 9/1978 | U.S.S.R. . |
| 1305177 | 4/1987 | U.S.S.R. . |
| 1313986 | 4/1973 | United Kingdom . |
| 1330894 | 9/1973 | United Kingdom . |
| 2035524 | 6/1980 | United Kingdom . |
| 2144055 | 2/1985 | United Kingdom . |
| 2170191 | 7/1986 | United Kingdom . |

OTHER PUBLICATIONS

Froehlichk, H., "Plasma Coating . . . ", Jun. 4, 1983, Derwent Publications Ltd., Accession No. 93-723535, (Week 8331).

Primary Examiner—Janyce Bell
Attorney, Agent, or Firm—Spencer, Frank & Schneider

[57] ABSTRACT

A ceramic welding process, including projecting a ceramic welding powder including a mixture of refractory particles and fuel particles composed of a fuel material which is capable of being oxidized to form a refractory oxide against a surface in at least one stream of carrier gas which contains at least sufficient oxygen for substantially complete oxidation of the fuel particles, whereby sufficient heat is released for at least surface melting of the projected refractory particles and a ceramic weld mass is formed against the surface under the heat of oxidation of the fuel particles; and projecting at least one additional stream of gas selected from the group consisting of carbon dioxide, nitrogen, and a gas containing oxygen against the surface so as to form a substantially continuous gas curtain surrounding the at least one stream of carrier gas.

13 Claims, 1 Drawing Sheet

CERAMIC WELDING PROCESS

BACKGROUND OF THE INVENTION

1. Field of the Invention

This invention relates to a ceramic welding process and to a lance suitable for use in such a process.

2. Background of the Art

Previous ceramic welding processes have been described in Glaverbel's British Patents Nos 1,330,894 and 2,170,191.

Ceramic welding is particularly suited to the in situ formation of a refractory mass on a refractory wall of furnaces or other refractory apparatus for the hot repair of the wall. It is preferably implemented when the wall is substantially at its normal operating temperature. It is particularly useful for repairing or reinforcing the walls or wall linings of glass melting furnaces, coke ovens, cement kilns or furnaces used in the petrochemical industry, or refractory apparatus used in ferrous or non-ferrous metal metallurgy. Moreover, the repair can sometimes be carried out during the operation of the furnace, for instance for the repair of a glass melting furnace superstructure, or during the normal operating cycle of the refractory article, for example a steel-pouring ladle can sometimes be repaired within the normal interval between teeming and recharging. The process is also useful for the formation of refractory components, for instance for the surfacing of other refractory substrates.

In the ceramic welding process as practised, a mixture of refractory particles and fuel particles (the "ceramic welding powder") is conveyed from a powder store along a feed line to a lance from which it is projected against a target surface. The carrier gas which leaves the lance outlet with the ceramic welding powder ("the carrier gas") may be pure (commercial grade) oxygen, or it may comprise a proportion of a substantially inert gas such as nitrogen, or indeed some other gas. In any event, the carrier gas leaving the lance outlet with the ceramic welding powder contains at least sufficient oxygen for substantially complete combustion of the fuel particles. It is by no means essential that the gas stream into which the welding powder is introduced from the feed store should have the same composition as the carrier gas which leaves the lance outlet. Some, or indeed all, of the required oxygen in the carrier gas may be introduced into the feed line at one or more locations between the powder introduction point and the outlet of the lance. The fuel used essentially consists of particles of a material which is capable of being oxidized exothermically to form a refractory oxide product. Examples of suitable fuels are silicon, aluminium, magnesium, zirconium, and chromium. Such metallic fuels may be used alone or in combination. The fuel burns and heat is liberated by its combustion to melt at least the surfaces of the refractory particles so that a strongly coherent refractory weld mass is formed which adheres well to the target surface.

It is common practice to select the ceramic welding powder in such a way that the weld deposit formed has a chemical composition which is approximately the same as that of the target surface. This assists in reducing thermal shock at the interface between a repair weld and the repaired refractory due to temperature cycling of the furnace. Such selection of the welding powder also helps to ensure that the refractory quality of the weld mass is sufficiently high for the location where that repair is made. Of course it is also known to select the ceramic welding powder in order to form a repair or lining of higher grade than the refractory on which the weld is formed.

When forming a refractory mass by ceramic welding, a certain amount of porosity may be incorporated in the weld mass. The extent of such porosity is dependent in part on the skill of the welder, and on the conditions under which the welding operation is carried out. Such porosity may be tolerable, indeed in some circumstances it may be advantageous, since a high degree of porosity promotes thermal insulation. However, an excessive degree of porosity may be objectionable at furnace locations where the refractory is subjected to particularly severe corrosive action, and especially the corrosive or erosive action of molten material contained within the furnace. The degree of porosity which is acceptable in a given piece of refractory material depends on the inherent refractoriness of that material and on the conditions to which it will be subjected in use.

The present invention results from research into the formation of a refractory lining or repair on parts of apparatus which are particularly likely to undergo intense erosion. This erosion may be due in particular to mechanical or thermo-mechanical abrasion, or to liquid or gaseous phase corrosion of the material forming the wall, or may be due to a combination of these effects.

One example of such a requirement for good resistance to a tendency to intense erosion is in the field of glass melting furnaces. The inner surface of the tank blocks of a glass melting furnace at the location of the surface of the molten glass bath provides a particular example of a refractory surface subject to very intense corrosive action. The tank block surface erodes very rapidly to such an extent that half the thickness of the blocks may be readily and comparatively rapidly eaten away at this location. This erosion is known by the technical term "flux line corrosion". Tank blocks subject to very high temperatures, such as the tank blocks of the melting and refining zones of the furnace, are conventionally formed of highly refractory materials such as refractory materials containing a high proportion of zirconia. Even so, they have to be continuously and vigorously cooled to lessen the erosion.

Other examples of refractories which are subject to risk of particularly severe erosion are casting orifices or ladles used in the manufacture or transport of molten metals, for example torpedo ladles, as used for instance in the iron and steel industry, copper smelting and refining furnaces, converters such as those used in steelmaking or in the non-ferrous metals industry. Cement kilns may also be mentioned here.

It is a principal object of this invention to provide a new ceramic welding process which facilitates the formation of high quality refractory weld masses which exhibit good resistance to erosion and corrosion.

SUMMARY OF THE INVENTION

According to this invention, there is provided a ceramic welding process in which a ceramic welding powder comprising a mixture of refractory particles and particles of a fuel material which is capable of being oxidized to form a refractory oxide is projected against a surface in one or more streams of carrier gas which contains at least sufficient oxygen for substantially complete oxidation of the fuel particles, whereby sufficient heat is released for at least surface melting of the projected refractory particles and a ceramic weld mass is formed against said surface under the heat of oxidation of the fuel particles, characterised in that at least one additional stream of gas is projected against said surface so as to form a substantially continuous gas curtain surrounding said carrier gas stream(s).

It is rather surprising that the blowing of additional gas in this way should have the beneficial effect which it does, of allowing the formation of ceramic welds of high quality with good resistance to erosion and corrosion more easily and more consistently than before. The achievement of a high quality weld by a method of the invention is less dependent on the skill of the individual welder than when forming a weld by a process in which the gas curtain is omitted but which is otherwise similar. We attribute this result to the fact that welds made by a process according to this invention tend to have a lower porosity than welds made by a process in which the gas curtain is omitted but which is otherwise similar.

The reasons why this beneficial effect should be achieved are not clear. One possibility is that the gas curtain isolates the ceramic welding reaction zone from the ambient furnace atmosphere, so preventing that atmosphere from having any adverse effect on those reactions, and preserving uniform working conditions at the reaction zone. Another possibility is that the gas curtain may have a quenching effect in reducing the temperature of the just-formed, still soft refractory deposit which may promote a favourable cooling and crystallization of the weld material. This may in turn act to reduce the propensity for gas which may become dissolved in the incipient ceramic weld mass while it is at least partially molten to form pores, so that any pores which are formed within the weld are of smaller size and thus less objectionable. However this theory goes against currently received wisdom in the art according to which it is not desirable for rapid cooling to take place in order to avoid problems of stratification due to inhomogeneities at boundary layers of material deposited by successive passes of the welding lance over the target surface.

The method of the invention is also surprising in that it would have been expected, in view of the difficulty of controlling the operating conditions, that the spraying of a gas curtain around the carrier gas stream and thus around the zone where the ceramic welding reactions take place and where the ceramic weld deposit is formed, would interfere with the exothermic reaction leading to the formation of the weld.

It has to the contrary been observed in practice that the projection of a gas curtain provides a supplementary parameter for controlling the different elements which come into play in the reaction zone in order to form the refractory mass during the performance of the method of the invention. This consequently provides a supplementary control parameter acting on the evolution of the exothermic reaction, thereby allowing improved control of the formation of the refractory weld mass.

It has also been observed that the gas curtain makes it possible to reduce the influence of the surrounding environment on the reaction zone. The reaction zone is consequently better protected from any turbulence which may exist in the surrounding atmosphere. Thus for example, in a common case where the process is used during the operation of the furnace, the reaction zone is made more independent of interference resulting for instance from the switching on or off of a burner in the vicinity of the operating location.

The gas curtain also makes it possible more readily to confine the particle mixture in the reaction zone so as to concentrate and intensify the ceramic welding reaction and thus lead to the formation of a refractory mass of high quality. The gas curtain assists in confining the projected refractory material and the fuel combustion products to the reaction zone so that they are readily incorporated into the weld mass formed. The incorporation of such combustion products into the refractory mass formed is no disadvantage in a ceramic welding process since those products are themselves refractory oxides.

The gas curtain may be projected from a multiplicity of outlets arranged in a ring around the powder discharge outlet(s). Of course such outlets would require to be closely spaced in order to produce a substantially continuous curtain. Preferably, however, the gas curtain is projected as an annular stream. The use of a continuous annular outlet for projecting an annular curtain stream promotes the efficiency of the curtain and can also a simpler construction of apparatus for performing the process of the invention. A protective sheath is thus formed around the carrier gas stream thereby making it possible to prevent material, in particular gases, from the surrounding atmosphere from being drawn into the carrier stream containing the oxidizing gas and the particle mixture. The whole region of the exothermic reaction and the spraying of the mixture in its oxidizing carrier gas can thus be isolated from the surrounding environment so as to prevent the introduction of any element foreign to and interfering with the exothermic reaction and the latter can consequently be better controlled.

In order to form the most efficient gas curtain around the carrier gas and entrained particles, the curtain gas should be ejected from one or more outlets which is or are spaced from the carrier gas outlet(s) but the different outlets should not be too widely spaced. The optimum spacing depends to a large extent upon the size of the carrier gas outlet(s).

Some preferred embodiments of the invention are primarily intended for small to moderate scale repairs, or situations where larger repairs are needed but the time available for repair is not critical, and the particles are projected from a lance having a single carrier gas outlet having a diameter of between 8 mm and 25 mm. The cross sectional area of such outlets will thus be between 50 and 500 mm$^2$. Such lances are suitable for projecting ceramic welding powder at rates of 30 to 300 kg/h. In some such preferred embodiments wherein the carrier gas is ejected from an outlet having an area of between 50 and 500 mm$^2$, the gas curtain is ejected from one or more outlets spaced from the carrier gas outlet by a distance of between 5 and 20 mm.

Other preferred embodiments of the invention are primarily intended for large scale repairs which must be effected in a short time, and the particles are projected from a lance having a carrier gas outlet having a cross sectional area of between 300 and 2,300 mm$^2$. Such lances are suitable for projecting ceramic welding powder at rates of up to 1000 kg/h, or even more. In some such preferred embodiments wherein the carrier gas is ejected from an outlet having an area of between 300 and 2,300 mm$^2$, the gas curtain is ejected from one or more outlets spaced from the carrier gas outlet by a distance of between 10 and 30 mm.

The adoption of one or other of these spacing ranges between the carrier gas and the curtain gas outlets promotes the formation of a clear and definite barrier between the ceramic welding reaction zone and the ambient atmosphere while allowing substantially avoidance of any interference between the different gas streams by ensuring that they remain substantially separate until they are deflected at the target surface.

Advantageously, the volume rate of discharge of the curtain gas is at least half the volume rate of discharge of the carrier gas. The adoption of this feature facilitates the formation of a thick and effective curtain. The discharge rate of the curtain gas may for example be at least two-thirds of the discharge rate of the carrier gas, or it may even be higher than the carrier gas discharge rate.

Preferably, the discharge velocity (calculated at normal pressure) of the curtain gas is greater than one fifth of the discharge velocity of the carrier gas. We measure gas volume discharge rates in normal cubic meters per hour, and gas discharge velocities are calculated from this volume discharge rate and the area of the outlet(s) from which the gas is discharged on the assumption that the gas pressure in the stream is normal at the moment when it leaves its outlet. The adoption of this feature allows the formation of an effective gas curtain. For the best results, we have found it preferable that the discharge velocity (calculated at normal pressure) of the curtain gas should be between one fifth and three fifths of the discharge velocity of the carrier gas. The adoption of this feature allows a low disturbance of the flow pattern of the carrier gas stream and of material in the ceramic welding reaction zone. The adoption of this feature further entails that there is a less abrupt gas velocity gradient from the carrier gas stream(s) to the ambient atmosphere than would otherwise be the case, and this is found to promote weld quality, perhaps because there is less dilution of the carrier gas stream and its entrained particles.

In some preferred embodiments of the invention, the gas streams are discharged from a lance which is cooled by fluid circulating through it. Such cooling may easily be achieved by providing the lance with a water jacket. Such a water jacket may be located to surround a central tube or tubes for the feed of carrier gas and ceramic welding powder, while being itself surrounded by an annular passage for the conveyance of curtain gas. The water jacket may easily be constructed to a thickness which is such as to ensure any desired spacing between the carrier gas outlet(s) and the curtain gas outlet. Alternatively, or in addition, there may be a water jacket which surrounds all the gas discharge tubes of the lance. In either case, the temperature of the curtain gas discharged will be, in general, and when considering the repair of furnaces at substantially their operating temperature, considerably lower than the environmental temperature within the furnace, and it may be at a temperature which is broadly similar to that of the carrier gas.

To do this runs wholly against conventional practice in the art of ceramic welding. One of the permanent concerns when carrying out ceramic welding is to prevent the temperature at the impact zone on the target surface from being too low during the formation of the refractory mass, for instance as a result of inadequate control of the various exothermic reaction parameters. An impact zone which is too cold may for instance lead to momentary interruptions of the exothermic reaction. It is in particular known that this temperature leads, if it is too low, to the formation of an irregular and uncontrolled porosity in the refractory weld mass formed so that it is rather porous and has little resistance to abrasion or corrosion. This porosity is particularly evident if the refractory mass is formed by several passes of the spray lance.

When the impact zone is displaced over the surface to be treated, at least part of this relatively cool gas, in a quantity sufficient to form an effective shield around the impact zone, tends to cool the surface being treated just prior to the impact of the welding material. This is not recommended at all in most welding techniques if an acceptable result is to be achieved. That there is advantage in spraying, according to this preferred feature of the invention, a cooled gas curtain against the surface of the substrate around the impact zone is completely surprising. Such a gas spray will tend to have a strong cooling effect on the impact zone and it would therefore be expected that this cooling would lead to the formation of a porous mass with little resistance to erosion.

Notwithstanding this, however, we have observed experimentally that, in a completely unexpected manner, the supplementary control parameter for the exothermic reaction provided by the adoption of the invention allows the formation of dense refractory masses more resistant to erosion than the masses formed in the past by ceramic welding methods, and in particular it does so when use is made of a cooled lance. This result is very surprising since it runs counter to the opinion which people skilled in the art have held in this field for many years.

The porosity of the refractory mass formed is one of the essential factors in determining its level of resistance to erosion. Porosity inherently weakens the structure of the refractory mass. Furthermore, the pores provide access routes for the erosive medium thereby making the refractory material more sensitive to erosion since the erosive medium can act within the interior of the mass.

There is also another consideration to be taken into account. Clearly, the projected refractory particles have to be heated to melt at least their surfaces in order to form a homogeneous weld mass, and the target surface must also be strongly heated to allow the best bond between the deposit and that surface. However, if the temperature at the target region is too high, there is a risk that the deposit will be too fluid to remain in position. This risk is of course higher on vertical or overhanging target surfaces. The risk is also greater the more vigorous is the ceramic welding reaction which takes place at the working site. Such a vigorous reaction may however be essential in order sustain the ceramic welding reactions, or to heat the target surface sufficiently for a good bond to be formed between the ceramic weld deposit and that surface, especially if the temperature of the target surface is not very high. We have in mind here temperatures below for example about 700° C. Such temperatures may be encountered in furnaces or kilns for processes carried out at only moderately high temperatures such as cement kilns or chemical reaction vessels. It has been observed in practice that the projection of a relatively cool gas curtain provides a means of controlling the temperature of the impact zone. It is thus easier to prevent the refractory mass being formed from flowing as a result of a high temperature in the impact zone. It is then possible to adjust the various parameters to create a very vigorous exothermic reaction to give reliable operation of the process and the formation of a good bond between the deposit and the target surface, even when the latter is not at a very high temperature, while cooling the impact zone to prevent the mass being formed from flowing. This facilitates the achievement of an homogeneous weld.

The cooling effect of the curtain stream can also have a further important effect in influencing the crystalline form which the weld mass assumes as it solidifies, and this can afford considerable benefits. By way of example, molten mixture of silica and alumina tend to form mullite when they are allowed to cool slowly: if on the other hand rapid cooling takes place, the alumina crystallizes out as corundum which can be held in a silica phase without the formation of mullite. This too can promote the resistance to erosion of the weld mass formed.

There are various gases which may be projected in order to form the required gas curtain, and the optimum choice of gas will depend on circumstances. While very good results can be achieved using carbon dioxide or nitrogen for forming the gas curtain, some preferred embodiments of the invention provide that the curtain gas comprises oxygen. For example air may be used since it is inexpensive and widely available. However, the use of commercial grade oxygen may be preferred: such oxygen will ordinarily be present for the performance of the ceramic welding operation anyway, and it is more efficient for the purpose in view. If the gas curtain comprises oxygen, it can provide a further oxygen reservoir in the immediate vicinity of the ceramic welding reaction zone, and this facilitates complete combustion of the fuel particles used. This promotes homogeneity within the ceramic weld mass, and it occasionally allows the proportion of the fuel in the ceramic welding powder mixture to be reduced slightly. However, it will be borne in mind that the carrier gas itself contains at least sufficient oxygen for substantially complete combustion of the fuel and accordingly, as has been stated, the use of an gas such as carbon dioxide or nitrogen which is substantially free from available oxygen does give beneficial results.

Indeed in certain special circumstances, the use of such a gas may be optimal. Some classes of refractory material contain particles of an oxidizable material such as carbon or silicon with a view to militating against the diffusion of oxygen through the refractory, or for other purposes, for example basic magnesia refractories containing up to 10% by weight carbon particles are used in the steel industry for certain converters. If it becomes necessary to repair such a refractory, it is desirable to ensure that the repair also contains a certain proportion of oxidizable material. Such a repair can be effected by a ceramic welding technique. Such a technique forms the subject of Glaverbel's British Patent Specification No. 2,190,671.

Thus in some preferred embodiments of the invention, the particles discharged in the carrier gas stream include particles of an oxidizable material which is to be incorporated as such in the weld mass and the curtain stream is substantially free from available oxygen. The adoption of this feature has the effect of substantially preventing the entrainment of additional oxygen, whether from the gas curtain or the ambient atmosphere, into the incipient weld mass at the reaction zone, and this can inhibit combustion of such oxidizable material so that the yield of oxidizable material left as such in the weld mass deposited is increased.

Advantageously, the fuel material comprises one or more of the materials in the group consisting of: aluminium, silicon, magnesium, zirconium and chromium. Such materials are all capable of being burnt to yield intense heat and form refractory oxide. Such elements may be used alone or in admixture as required. Furthermore, alloys of such materials may be used. The alloying of an element which combusts very easily and rapidly with one which is more reluctant to combust ensures an intimate mixture of those elements, and by suitable selection of the alloy constituents, a more stable reaction which proceeds at a more desirable reaction rate can be achieved.

Advantageously, at least 50% by weight of the fuel particles have a grain size less than 50 $\mu$m, and preferably, at least 90% by weight of the fuel particles have a grain size less than 50 $\mu$m. The average grain size may for example be less than 15 $\mu$m, and their maximum grain size less than 100 $\mu$m and preferably less than 50 $\mu$m. The fuel particles thus oxidize readily thereby facilitating the development of intense heat energy in a small space and the achievement of a good weld between the particles of refractory material. The small size of these fuel particles also promotes their complete combustion and consequently the homogeneity of the mass formed.

Preference is given to the formation of ceramic weld masses of particularly high refractory quality, and to that end it is preferred that at least the greater part by weight of the refractory particles projected consists of alumina and/or zirconia, or of magnesia and/or alumina.

The invention extends to a ceramic weld mass when formed by a process according to the invention, and it also includes apparatus specially adapted for the performance of the process.

Accordingly, the present invention includes a lance comprising an outlet for the discharge of a ceramic welding powder in a carrier gas along a discharge path towards a surface for the performance of a ceramic welding process, characterised in that such lance comprises a second outlet or group of second outlets, for the discharge of gas, said second outlet or outlet group being so shaped and arranged and so spaced both axially and radially in relation to the powder outlet that gas can be discharged from said second outlet or outlet group so as to form a substantially continuous curtain surrounding and generally parallel to the powder discharge path.

The lance of the invention is simple and makes it possible readily to form a gas curtain around the zone of the impact of the carrier gas stream and entrained powder discharged from the powder outlet. This lance of the invention provides the welding operator with a supplementary control parameter allowing him to achieve a high-quality ceramic weld.

The curtain gas may be discharged from a group of spray orifices disposed around the powder outlet, but preferably, such second outlet for the discharge of curtain gas is a continuous annular outlet. This is a simple, easy and effective way of maintaining a gas curtain around the carrier gas stream comprising the oxidizing gas and the particle mixture. Such annular outlet need not be strictly circular. Indeed it may have a rectangular shape if desired.

In order to form the most efficient gas curtain around the carrier gas and entrained particles, the curtain gas should be ejected from one or more outlets which is or are spaced from the carrier gas outlet(s) but the different outlets should not be too widely spaced. The optimum spacing depends to a large extent upon the scale of operations in which the lance is intended to be used.

Some lances according to the invention are primarily intended for small to moderate scale repairs, or where time is not a critical factor, and the lance has a carrier gas outlet having a diameter of between 8 mm and 25 mm, or an outlet group having a comparable aggregate outlet area. The (aggregate) cross sectional area of such outlets will thus be between 50 and 500 mm$^2$. Such lances are suitable for projecting ceramic welding powder at rates of 30 to 300 kg/h. In some such preferred embodiments wherein such powder outlet has an aggregate area of between 50 and 500 mm$^2$, the or each said second outlet is spaced from the powder outlet by a distance of between 5 and 20 mm.

Other lances according to the invention are primarily intended for large scale or rapid repairs, and the lance has a single carrier gas outlet or a group of carrier gas outlets having a cross sectional area of between 300 and 2300 mm$^2$. Such lances are suitable for projecting ceramic welding powder at rates of up to 1000 kg/h, or even more. In some such preferred embodiments wherein such powder outlet has an aggregate area of between 300 and 2300 mm$^2$, the or each said second outlet is spaced from the powder outlet by a distance of between 10 and 30 mm.

The adoption of one or other of these spacing ranges between the carrier gas and the curtain gas outlets promotes the formation of a clear and definite barrier between the ceramic welding reaction zone and the ambient atmosphere while allowing substantially avoidance of any interference between the different gas streams.

In some preferred embodiments of the invention, such lance incorporates a jacket adapted for the circulation of coolant. The preferred coolant is water in view of its thermal capacity and ready availability. Such a water jacket may be located to surround a central tube or tubes for the feed of carrier gas and ceramic welding powder, while being itself surrounded by an annular passage for the conveyance of curtain gas. The water jacket may easily be constructed to a thickness which is such as to ensure any desired spacing between the carrier gas outlet(s) and the curtain gas outlet. Alternatively, or in addition, there may be a water jacket which surrounds all the gas discharge tubes of the lance. In either case, the temperature of the curtain gas discharged will be, in general, and when considering the repair of furnaces at substantially their operating temperature, considerably lower than the environmental temperature within the furnace, and it may be at a temperature which is broadly similar to that of the carrier gas.

The advantageous effect this has on the formation of a ceramic weld mass has already been explained. In addition to that, the provision of a cooling jacket means that the lance may remain in a high temperature environment such as that within a furnace or other refractory structure at its operating temperature for considerable periods of time without becoming overheated. This has advantages for operational reasons, and it also helps to prolong the useful life of the lance.

Preferably, the area of the second outlet or outlet group is between two thirds of and three times the area of the powder outlet. Such a second outlet (group) area is advantageous for the discharge of a curtain gas stream at the optimum curtain gas stream velocity, in sufficient volume to provide an effective gas curtain.

BRIEF DESCRIPTION OF THE DRAWINGS

Preferred embodiments of the invention will now be described by way of example with reference to the accompanying drawings, in which.

DESCRIPTION OF THE PREFERRED EMBODIMENTS

Figure 1:
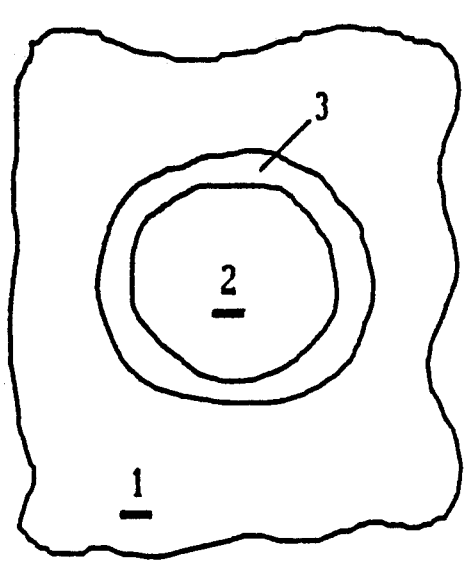
FIG. 1 is a diagram of the spray zone on a substrate surface during the implementation of the method of the invention.

In FIG. 1, reference 1 represents a target portion of the surface of the substrate on which it is desired to form a refractory ceramic weld mass by spraying this surface with a carrier gas stream comprising oxidizing gas and a mixture of refractory particles and fuel. This carrier gas stream strikes the surface 1 in the diagram at an impact zone 2. According to the invention, the surface 1 is simultaneously sprayed with one or more peripheral gas jets which surrounds the impact zone 2 to form a gas curtain around the impact zone 2. FIG. 1 shows in diagrammatic form the intersection of this gas curtain with the surface 1 at an annular zone 3 which closely surrounds the impact zone 2. It is evident that the annular zone 3 may in practice be slightly spaced from the impact zone 2 or in contrast that the annular zone 3 and the impact zone 2 may partially interpenetrate one another.

Figure 2:
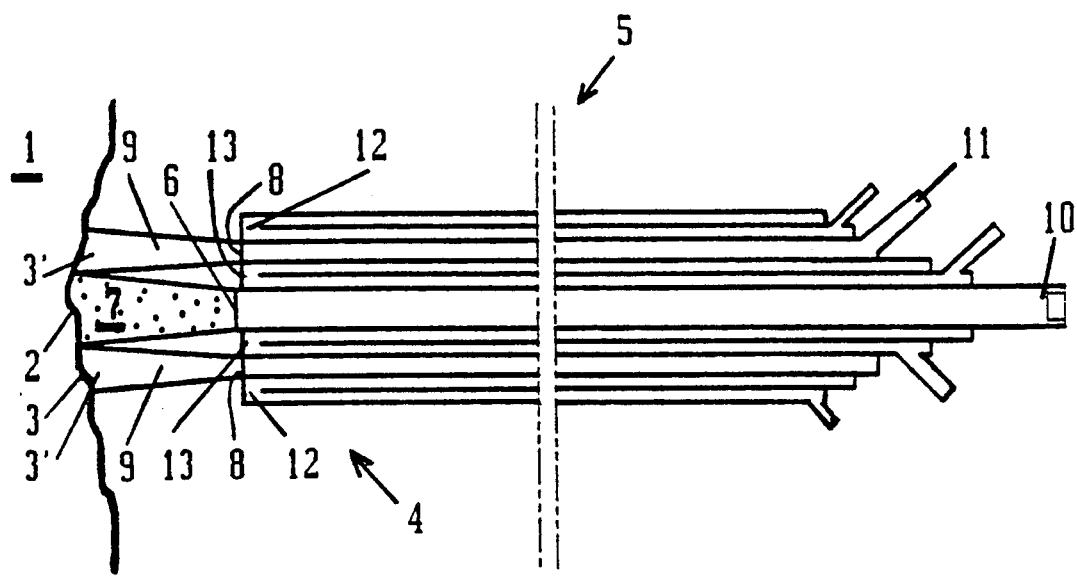
FIG. 2 is a diagrammatic and partial section through a spray lance of the invention.

In FIG. 2, the spray head 4 of the lance 5 comprises a central outlet 6 for spraying the carrier gas stream 7 comprising the mixture of particles dispersed in the oxidizing gas. In place of a single central outlet 6, the lance may comprise a group of several outlets for spraying the carrier gas stream 7. A spray lance comprising a outlet group of this type is disclosed and claimed for instance in Glaverbel's British Patent Specification 2,170,122. The lance head 4 also comprises, in accordance with the invention, curtain gas spray means. In the embodiment shown in FIG. 2, the curtain gas spray means comprise an annular outlet 8 which surrounds and is spaced from the central outlet 6 in order to spray a substantially continuous annular gas stream 9. The gas stream 9 forms the gas curtain 3' which strikes the surface 1 in an annular zone 3. In a specific example, the area of the annular outlet 8 is slightly more than double the area of the central outlet 6. The mixture of particles, dispersed in the oxidizing gas, is introduced via the supply tube 10 and the gas of the curtain gas jet via the duct 11. The lance 5 also comprises an external cooling ring 12 with a cooling water inlet and outlet. FIG. 2 also shows a cooling ring 13, with a cooling water inlet and outlet, which keeps the annular outlet 8 spaced from the central outlet 6. This cooling ring may be omitted, however, if so desired and replaced by a single small insert making it possible to keep the annular outlet 8 spaced from the central outlet 6, for example by 7 mm.

Figure 3:
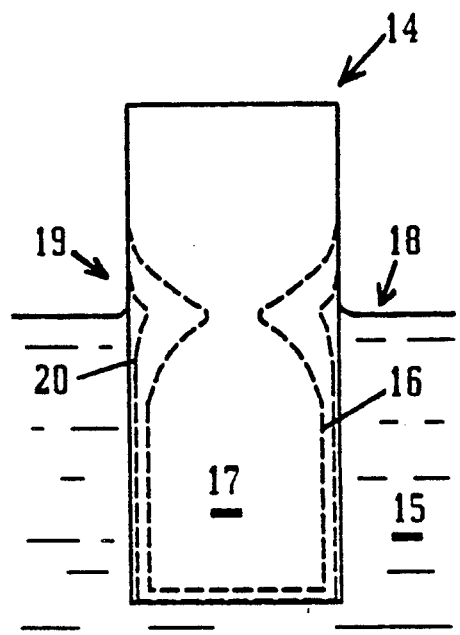
FIG. 3 is a diagram of an erosion test conducted on refractory masses.

FIG. 3 is a diagram of an erosion test on a refractory ceramic weld mass. A prismatic bar 14, cut from the refractory mass to be tested, is partially immersed in a molten glass bath 15 at 1550° C. contained in a crucible (not shown). This temperature is higher than the highest temperature normally used for molten soda-lime glass (ordinary window glass) in a glass melting furnace. The bar is kept immersed and its degree of wear examined after 16 hours.

EXAMPLE 1

The tank blocks of the melting end of a glass melting furnace have to be repaired without cooling the furnace. These blocks are highly eroded, essentially at the location of the surface of the molten glass bath where "flux line corrosion" has taken place. These tank blocks are highly refractory electrofused bricks based on alumina and zirconia, whose composition comprises, by weight, 50–51% of alumina, 32–33% of zirconia, 15–16% of silica and approximately 1% of sodium oxide and which have a true density of 3.84. In order to permit access to this surface for repair, the level of molten glass was lowered by twenty or so centimetres. In order to carry out the repair, a carrier gas stream comprising oxidizing gas and a mixture of refractory particles and fuel was sprayed onto the hot tank block. The mixture of particles comprised 40–50% of $ZrO_2$, 38–44% of $Al_2O_3$, together with 12% fuel made up of 8–4% of Al and 4–8% of Si, all by weight of the total mixture. The silicon particles were grains with an average size of 6 $\mu m$ and a specific surface area of 5000 $cm^2/g$. The aluminium particles were grains with an average size of 5 $\mu m$ and a specific surface area of 4700 $cm^2/g$. The maximum grain size of the aluminium and silicon particles did not exceed 50 $\mu m$. The silicon and aluminium particles combusted giving off sufficient heat to melt the refractory particles at least partially so that they bonded together. The refractory particles of zirconia had an average grain size of 150 $\mu m$ and the refractory particles of alumina had an average grain size of 100 $\mu m$.

In order to test the resistance to corrosion by glass of the refractory mass formed on the surface of the furnace tank blocks, a refractory mass was firstly formed on the surface of a spare tank block heated to 1500° C. in a test furnace using the method of the invention. For this test, use was made of 8% by weight of Si and 4% by weight of Al in the mixture.

The mixture of particles dispersed in the oxidizing gas was sprayed by the lance 5 shown in FIG. 2. It was introduced via the supply tube 10. The central powder outlet 6 was circular and had an area of 113 $mm^2$. The mixture was sprayed at a flow rate of 30 kg/h with oxygen as the oxidizing gas at a rate of 25 $Nm^3/h$. The carrier gas stream 7 comprising the particle mixture and the oxidizing gas struck the surface 1 to be treated at an impact zone 2. According to the invention this surface 1 was also sprayed with a curtain gas jet which formed a gas curtain 3' around the impact zone 2. In this example, the curtain gas jet was formed by pure oxygen sprayed through the annular outlet 8 at a flow rate of 40 $Nm^3/h$ in the form of an annular gas stream 9 surrounding the carrier gas stream 7 along its path from the head 4 of the lance 5 to the impact zone 2. The annular outlet 8 had a circular cross-section and an area of 310 $mm^2$. The annular outlet 8 was spaced from the powder outlet 6 by 13 mm.

During the implementation of the method, the gas curtain 3' provided a supplementary means of acting on the evolution on the ceramic welding reaction and the formation of the refractory mass. The ceramic welding reaction was stable and relatively well defined. The true porosity of the mass formed was 9% and its apparent porosity 1.5%. As the expressions are used in this specification, "apparent porosity" is measured by a method analogous to immersion and thus only takes account of open pores in the refractory material: "true porosity" also takes account of any closed pores in the refractory material. The apparent density of the refractory mass formed, i.e. the density of the mass with its pores was 3.5. The true or absolute density of this mass, i.e. the density of the refractory matrix material itself, measured on a sample finely crushed to eliminate the influence of the pores, was 3.85.

A prismatic bar 14 (FIG. 3) of 20×20×120 mm was cut from this refractory ceramic weld mass. This test bar was kept partially immersed in a bath 15 of molten glass at 1550° C. contained in a crucible (not shown). The degree of wear of the bar after 16 hours was noted.

By way of comparison, a control sample of identical size was prepared and was kept partially immersed in the same molten glass bath at the same temperature. In order to facilitate the comparison, drawings of the control sample and the test bar have been shown superimposed in FIG. 3. The control sample was a prismatic bar which was cut from a refractory mass formed in the same way as the refractory mass of Example 1 except that the curtain gas jet was omitted, i.e. a refractory ceramic weld mass formed by a method outside the scope of the present invention. The refractory mass formed in this way had a true porosity of 19.7% and an apparent porosity of 3.5%. It had an apparent density of 3.03 and an absolute density of 3.77.

After 16 hours the bar 14 of the control sample assumed a shape shown diagrammatically by the dashed line 16. It can be seen that the immersed portion 17 of the bar 14 had undergone considerable corrosion as a result of its immersion in the glass bath. The edges of the prism were rounded. It can be seen that the surface 18 of the molten glass bath 15 had considerably eroded the sample giving it a particular "flux line corrosion" shape at the zone indicated by reference numeral 19. The diameter of the bar at the centre of the "flux line corrosion" had been reduced to approximately one-third of its nominal value.

The bar 14 cut from the refractory mass formed by the implementation of the method of the invention assumed, after 16 hours, the shape shown by the dashed line 20. The erosion of the immersed portion was obviously smaller. The edges of the prism had not been rounded to any great extent. The "flux line corrosion" 19 was far less pronounced than in the control sample. The diameter of the bar at the centre of the "flux line corrosion" was reduced to only approximately two-thirds of its nominal value. The use of the method of the invention thus enabled the production of a refractory mass much more resistant to erosion than the mass formed by the prior method. Microscope examination of a section of the bar also showed that there were in practice no residual metal phases showing that the oxidation of the metal particles was in practice complete. This factor is very favourable for a refractory mass which has to come into contact with molten glass as it is known that the contact of metal phases with the molten glass may cause bubbles to develop in the glass.

EXAMPLE 2

As a variant of FIG. 1, a refractory ceramic weld mass was produced in the same way as in Example 1 except that the oxygen flow rate of the carrier gas stream 7 was 30 $Nm^3/h$ and the oxygen flow rate of the curtain gas jet 9 was 20 $Nm^3/h$. The refractory ceramic weld mass formed had an apparent porosity of 2%, a true porosity of 8.3%, an apparent density of 3.56 and a true density of 3.88.

A prismatic bar 14 was cut from this ceramic weld mass and partially immersed in the molten glass bath 15 contained in the crucible. After 16 hours the erosion test showed erosion similar to the ceramic weld mass of Example 1. The bar assumed the shape shown by the dashed line 20. Microscope examination of a section of this bar also showed that there were in practice no residual metal phases.

EXAMPLE 3

A refractory ceramic weld mass was produced in the same way as in Example 1 except that the curtain gas jet 9 was formed by carbon dioxide sprayed at a flow rate of 20 Nm$^3$/h and the oxygen of the carrier gas stream 7 was sprayed at a flow rate of 30 Nm$^3$/h. It was also observed that the ceramic welding reaction was stable and relatively well defined. The refractory ceramic weld mass formed had an apparent porosity of 1.5%, a true porosity of 4.6%, an apparent density of 3.5 and an absolute density of 3.67.

A prismatic bar 14 was cut from this ceramic weld mass and partially immersed in the molten glass bath 15 contained in the crucible. After 16 hours the erosion test showed erosion similar to the ceramic weld mass of Example 1. The bar substantially assumed the shape shown by the dashed line 20.

EXAMPLE 4

A refractory ceramic weld mass was produced in the same way as in Example 1 except that the gas curtain 9 was formed by nitrogen sprayed at a flow rate of 18 Nm$^3$/h and the oxygen of the carrier gas stream 7 was sprayed at a flow rate of 30 Nm$^3$/h. It was also observed that the ceramic welding reaction was stable and relatively well defined. The refractory ceramic weld mass formed had an apparent porosity of 2.5%, an apparent density of 3.5 and a true density of 3.69.

A prismatic bar 14 was cut from this ceramic weld mass and partially immersed in the molten glass bath 15 contained in the crucible. After 16 hours the erosion test showed erosion similar to the ceramic weld mass of Example 1. The bar substantially assumed the shape shown by the dashed line 20.

EXAMPLE 5

The following mixture, by weight, was used to carry out a consolidation repair to a furnace vault formed by silica bricks at a temperature of approximately 1500° C.: 87% of refractory silica particles, 12% of combustible silicon particles and 1% of combustible aluminium particles. The silicon and aluminium particles each had an average grain size of less than 10 μm, the specific surface area of the silicon being 4000 cm$^2$/g and that of the aluminium 6000 cm$^2$/g. The maximum grain size of the aluminium and silicon particles did not exceed 50 μm.

This mixture was sprayed using the method of the invention. The particle mixture was introduced with pure oxygen via the supply tube 10 at a rate of 35 kg/h of material and 25 Nm$^3$/h of oxygen for spraying in the form of the carrier gas stream 7. In accordance with the invention, the target surface 1 to be treated was also sprayed with a curtain gas jet which formed a gas curtain 3' around the impact zone 2. In this example, the curtain gas jet was formed by pure oxygen sprayed at a flow rate of 30 Nm$^3$/h in the form of a curtain gas jet 9 surrounding the carrier gas stream 7 along its path from the head 4 of the lance 5 to the impact zone 2. No non-combusted metal was in practice found in the ceramic weld mass formed.

By way of comparison, a refractory ceramic weld mass was formed by spraying the same mixture as above at a rate of 30 kg/h with a same oxygen flow rate of 25 Nm$^3$/h. For this comparison, however, the curtain jet of oxygen was omitted.

During the implementation of the method of the invention, it was observed that the gas curtain 3' provided a supplementary means of action for controlling the formation of the refractory ceramic weld mass which did not exist in the case of the comparison test. Moreover, the gas curtain 3' isolated the impact zone 2 so that the atmospheric turbulence due to the operation of the furnace during the repair had practically no effect on the formation of the refractory ceramic weld mass. The ceramic welding reaction was more stable and better confined and did not take place intermittently.

EXAMPLE 6

A copper converter used in the non-ferrous metals industry was to be repaired. The same method as in Example 5 was used except that the mixture had the following composition by weight: 40% of chromium oxide particles, 48% of magnesia particles and 12% of aluminium particles. The aluminium particles had a nominal maximum grain size of 45 μm and a specific surface area of more than 3000 cm$^2$/g. The refractory particles all had a maximum size of less than 2 mm. This example also showed that, as a result of the implementation of the invention, the gas curtain provided a supplementary means of action for controlling the evolution of the ceramic welding reaction and the formation of the refractory ceramic weld mass. The ceramic welding reaction was stable and well confined.

By way of a variant, the annular outlet 8 of the spray head 4 was replaced by a series of injectors spraying gas jets converging to form the gas curtain 3'. Very good results were also obtained with this spray lance.

EXAMPLE 7

It was desired to form a refractory ceramic weld mass having a composition as close as possible to the basic refractory on a wall of a steelworks converter formed by magnesium-carbon bricks comprising 90% by weight of magnesia and 10% of carbon. The wall was at a temperature of 900° C. These bricks were sprayed with a particle mixture comprising particles containing carbon. The mixture was sprayed at a rate of 500 kg/hour in an oxidizing gas carrier gas stream containing 70% by volume of oxygen. The mixture had the following composition by weight:

| | |
|---|---|
| MgO | 82% |
| Si | 4% |
| Al | 4% |
| C | 10%. | the silicon particles had an average diameter of 10 μm and a specific surface area of 5000 cm$^2$/g. The aluminium particles had an average diameter of 10 μm and a specific surface area of 8000 cm$^2$/g. The carbon particles were particles formed by crushing coke and their average diameter was 1.25 mm. The magnesia particles had an average diameter of 1 mm. According to the invention, a gas curtain was formed around the impact zone of the carrier gas stream comprising the particles dispersed in the oxidizing gas on the wall of the converter by spraying carbon dioxide at a rate of flow 50% higher than the flow rate of the oxidizing gas to form a gas curtain around this carrier gas stream. It was observed during the implementation of the method that the ceramic welding reaction was stable and well confined. The carbon particles sprayed did not oxidize totally so that the ceramic weld mass formed contained some 5% of carbon. Without the gas curtain formed by the carbon dioxide jet the ceramic weld mass formed contained only some 3% of carbon.

In a variant embodiment of lance for the discharge of ceramic welding powder at a rate of between 900 kg/h and 1,000 kg/h, there is a central powder discharge outlet 6 having a diameter of 53 mm and thus an area of 2,206 mm$^2$. The lance also comprised a continuous annular curtain gas discharge outlet having an area of 1,979 mm$^2$ spaced from the powder discharge outlet by 13 mm, for example by means of a sleeve adapted on the end of the central pipe or by means of a cooling ring 13. The lance also comprised an external cooling ring 12.

What is claimed is:

1. A ceramic welding process comprising:
   projecting from a lance outlet a ceramic welding powder comprising a mixture of refractory particles and fuel particles composed of a fuel material which is capable of being oxidized to form a refractory oxide against a surface in at least one stream of carrier gas which, when leaving the lance outlet, contains at least sufficient oxygen for substantially complete oxidation of the fuel particles, whereby sufficient heat is released for at least surface melting of the projected refractory particles and a ceramic weld mass is formed against said surface under the heat of oxidation of the fuel particles; and
   projecting at least one additional stream of gas selected from the group consisting of carbon dioxide, nitrogen, and a gas containing oxygen against said surface so as to form a gas curtain which is substantially continuous and which surrounds said at least one stream of carrier gas.

2. The process according to claim 1, wherein the gas curtain is projected as an annular stream.

3. The process according to claim 1, wherein the carrier gas is ejected from a carrier gas outlet having an area ranging between 50 and 500 mm$^2$, and wherein the gas curtain is ejected from at least one outlet spaced from the carrier gas outlet by a distance ranging between 5 and 20 mm.

4. The process according to claim 1, wherein the carrier gas is ejected from an outlet having an area ranging between 300 and 2,300 mm$^2$, and wherein the gas curtain is ejected from at least one outlets spaced from the carrier gas outlet by a distance of between 10 and 30 mm.

5. The process according claim 1, wherein the curtain gas has a volume rate of discharge which is at least half that of the carrier gas.

6. The process according to claim 1, wherein the curtain gas has a discharge velocity (calculated at normal pressure) which is greater than one fifth that of the carrier gas.

7. The process according to claim 6, wherein the discharge velocity (calculated at normal pressure) of the curtain gas is between one fifth and three fifths that of the carrier gas.

8. The A process according to claim 1, wherein the at least one stream of carrier gas and the at least one additional stream of gas are discharged from a lance which is cooled by fluid circulating therethrough.

9. The process according to claim 1, wherein the curtain gas comprises oxygen.

10. The process according to claim 1, wherein the ceramic welding powder additionally comprises particles of an oxidizable material which is to be incorporated as such in the ceramic weld mass, and wherein the at least one additional stream of gas which forms the gas curtain is substantially free of oxygen as oxygen.

11. The process according to claim 1, wherein the fuel material comprises at least one material selected from the group consisting of aluminium, silicon, magnesium, zirconium, and chromium.

12. The process according to claim 1, wherein at least 50% by weight of the fuel particles have a grain size which is less than 50 μm.

13. The process according to claim 1, wherein at least a greater part by weight of the refractory particles projected consists of a material selected from the group consisting of (a) at least one of alumina and zirconia, and (b) at least one of magnesia and alumina.

* * * * *